US011068665B2

(12) United States Patent
Dash et al.

(10) Patent No.: US 11,068,665 B2
(45) Date of Patent: Jul. 20, 2021

(54) HYPERNYM DETECTION USING STRICT PARTIAL ORDER NETWORKS

(71) Applicant: International Business Machines Corporation, Armonk, NY (US)

(72) Inventors: Sarthak Dash, Jersey City, NJ (US); Alfio Massimiliano Gliozzo, Brooklyn, NY (US); Md Faisal Mahbub Chowdhury, Woodside, NY (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/575,107

(22) Filed: Sep. 18, 2019

(65) Prior Publication Data

US 2021/0081500 A1 Mar. 18, 2021

(51) Int. Cl.
G06F 40/30 (2020.01)
G06N 3/08 (2006.01)

(52) U.S. Cl.
CPC ............... *G06F 40/30* (2020.01); *G06N 3/08* (2013.01)

(58) Field of Classification Search
CPC .................................. G06F 40/30; G06N 3/08
See application file for complete search history.

(56) References Cited

U.S. PATENT DOCUMENTS

| 6,246,977 | B1 | 6/2001 | Messerly et al. |
| 8,135,730 | B2 | 3/2012 | Lim et al. |
| 8,463,593 | B2 | 6/2013 | Pell et al. |
| 10,289,680 | B2 | 5/2019 | Scally et al. |
| 10,409,803 | B1 * | 9/2019 | Lai ...................... G06F 16/2365 |
| 10,705,796 | B1 * | 7/2020 | Doyle ......................... G06F 7/08 |
| 2010/0036829 | A1 * | 2/2010 | Leyba ................. G06F 16/3344 707/739 |

(Continued)

FOREIGN PATENT DOCUMENTS

| CN | 105787105 A | 7/2016 |
| CN | 105808525 A | 7/2016 |

(Continued)

OTHER PUBLICATIONS

Nguyen, K. A. et al.; "Hierarchical Ernbeddings for Hypernymy Detection and Directionality Directionality", Proceedings of the 2017 Conference on Empirical Methods in Natural Language Processing, Sep. 7-11, 2017, pp. 233-243, Association for Computational Linguistics, Copenhagen, Denmark.

(Continued)

*Primary Examiner* — Kevin Ky
(74) *Attorney, Agent, or Firm* — Sherman IP LLP; Kenneth L. Sherman; Hemavathy Perumal

(57) ABSTRACT

One embodiment of the present invention provides a method comprising receiving a text corpus, and generating a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The method further comprises training a neural network for hypernym induction based on the first list. The trained neural network is a strict partial order network (SPON) model.

20 Claims, 5 Drawing Sheets

(56) References Cited

U.S. PATENT DOCUMENTS

| | | | |
|---|---|---|---|
| 2013/0138438 A1* | 5/2013 | Bachtiger | G06F 16/48 704/235 |
| 2013/0226936 A1 | 8/2013 | Lee et al. | |
| 2014/0059011 A1 | 2/2014 | Bostick et al. | |
| 2015/0254565 A1* | 9/2015 | Beigman Klebanov | G06N 7/005 706/12 |
| 2015/0347500 A1* | 12/2015 | Li | G06F 16/2423 707/733 |
| 2016/0292149 A1* | 10/2016 | Mote | G06F 40/30 |
| 2017/0124479 A1* | 5/2017 | Baughman | G06N 20/00 |
| 2017/0262528 A1 | 9/2017 | Potok et al. | |
| 2017/0329760 A1 | 11/2017 | Rachevsky | |
| 2018/0181837 A1 | 6/2018 | Gorelick et al. | |
| 2019/0130305 A1* | 5/2019 | Sivertson | G06N 5/022 |
| 2019/0138659 A1 | 5/2019 | Kushkuley et al. | |
| 2020/0250453 A1* | 8/2020 | Gupta | G06F 3/04845 |

FOREIGN PATENT DOCUMENTS

| | | |
|---|---|---|
| CN | 106569993 A | 4/2017 |
| JP | 2014013549 A | 1/2014 |
| WO | 20141885551 A1 | 11/2014 |

OTHER PUBLICATIONS

Ustalov, D. et al.; "Unsupervised Sense-Aware Hypernymy Extraction", KONVENS 14th Conference on Natural Language Processing, Sep. 19-21, 2018, pp. 192-201, Vienna, Austria.

Panchenko, A. et al.; "Improving Hypernymy Extraction With Distributional Semantic Classes", LREC 11th International Conference on, May 7-12, 2018, pp. 1541-1551, United States.

Chang, H-S et al.; "Distributional Inclusion Vector Embedding for Unsupervised Hypernymy Detection", NAACL-HLT Conference on, Jun. 1-6, 2018, vol. 1, pp. 485-495, United States.

Lefever, E., "LT3: A Multi-modular Approach to Automatic Taxonomy Construction," Proceedings of the 9th International Workshop on Semantic Evaluation (SemEval 2015), Jun. 4-5, 2015, pp. 944-948, Association for Computational Linguistics, United States.

Panchenko, A. et. al, "TAXI at SemEval-2016 Task 13: a Taxonomy Induction Method based on Lexico-Syntactic Patterns, Substrings and Focused Crawling", Proceedings of SemEval—2016, Jun. 16-17, 2016, pp. 1320-1327, United States.

Roller, S. et al., "Hearst Patterns Revisited: Automatic Hypernym Detection from Large Text Corpora," pp. 1-6, arXiv preprint arXiv:1806.03191 (2018), United States.

Shwartz, V. et al., "Hypernyms under Siege: Linguistically-motivated Artillery for Hypernymy Detection", JDec. 14, 2016, pp. 1-11, arXiv preprint arXiv:1612.04460, United States.

Snow, R. et al., "Learning syntactic patterns for automatic hypernym discovery", In Advances in neural information processing systems, 2005, pp. 1297-1304, United States.

Hearst, M.A., "Automatic acquisition of hyponyms from large text corpora", Proc. of COLING 1992, Aug. 23-28, 1992, pp. 539-545.

Li, X. et al., "Phrasenet: towards context sensitive lexical semantics", Proceedings of the seventh conference on Natural language learning at HLT-NAACL, 2003, pp. 1-8, vol. 4, Association for Computational Linguistics, United States.

Miller, G.A., "WordNet: A Lexical Database for English", Communications of the ACM, Nov. 1995, pp. 39-41, vol. 38, No. 11, United States.

Fellbaum, C. et al., "WordNet: An Electronic Lexical Database," 1998, pp. 1-38, MIT Press, Cambridge, MA.

Ritter, A. et al "What Is This, Anyway: Automatic Hypernym Discovery," Association for the Advancement of Artificial Intelligence, 2009, pp. 88-93, www.aaai.org, United States.

Le, M. et al., "Inferring Concept Hierarchies from Text Corpora via Hyperbolic Embeddings", Feb. 3, 2019, pp. 1-11, Download at: https://arxiv.org/pdf/1902.00913.pdf, United States.

Baroni, M. et al., "How we BLESSed distributional semantic evaluation," Proceedings of the GEMS 2011 Workshop on Geometrical Models of Natural Language Semantics, Jul. 31, 2011, pp. 1-10, Association for Computational Linguistics, United Kingdom.

Camacho-Collados, J., et al., "SemEval-2018 Task 9: Hypernym Discovery," Proceedings of the 12th International Workshop on Semantic Evaluation, 2018, pp. 712-724, Association for Computational Linguistics, United States.

International Search Report & Written Opinion dated Dec. 24, 2020 for International Application PCT/IB2020/058575 from National Intellectual Property Administration, pp. 1-8, Beijing China.

* cited by examiner

HYPERNYM DETECTION USING STRICT PARTIAL ORDER NETWORKS

The present invention generally relates to the field of hypernym induction, and more specifically, to a method and system for neural network-based hypernym induction.

SUMMARY

One embodiment of the present invention provides a method comprising receiving a text corpus, and generating a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The method further comprises training a neural network for hypernym induction based on the first list. The trained neural network is a strict partial order network (SPON) model.

Another embodiment of the present invention provides a system comprising at least one processor and a non-transitory processor-readable memory device storing instructions that when executed by the at least one processor causes the at least one processor to perform operations. The operations include receiving a text corpus, and generating a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The operations further include training a neural network for hypernym induction based on the first list. The trained neural network is a SPON model.

One embodiment of the present invention provides a computer program product comprising a computer readable storage medium having program instructions embodied therewith. The program instructions are executable by a processor to cause the processor to receive a text corpus, and generate a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The program instructions are further executable by the processor to cause the processor to train a neural network for hypernym induction based on the first list. The trained neural network is a SPON model.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
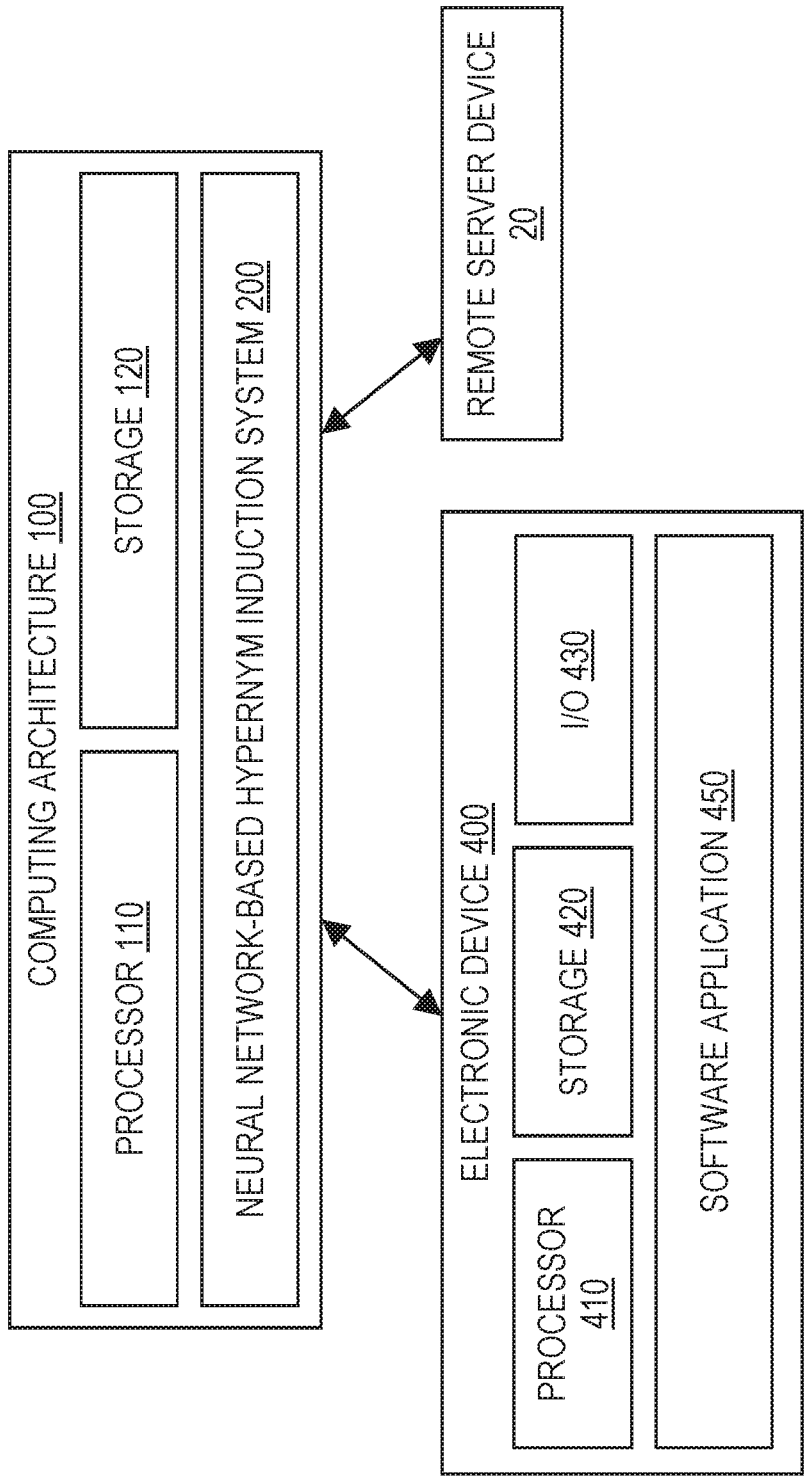
FIG. 1 illustrates an example computing architecture for implementing neural network-based hypernym induction, in accordance with an embodiment of the invention.

The detailed description explains the preferred embodiments of the invention, together with advantages and features, by way of example with reference to the drawings.

DETAILED DESCRIPTION

The present invention generally relates to the field of hypernym induction, and more specifically, to a method and system for neural network-based hypernym induction. One embodiment of the present invention provides a method comprising receiving a text corpus, and generating a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The method further comprises training a neural network for hypernym induction based on the first list. The trained neural network is a strict partial order network (SPON) model.

Another embodiment of the present invention provides a system comprising at least one processor and a non-transitory processor-readable memory device storing instructions that when executed by the at least one processor causes the at least one processor to perform operations. The operations include receiving a text corpus, and generating a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The operations further include training a neural network for hypernym induction based on the first list. The trained neural network is a SPON model.

One embodiment of the present invention provides a computer program product comprising a computer readable storage medium having program instructions embodied therewith. The program instructions are executable by a processor to cause the processor to receive a text corpus, and generate a first list of triples based on the text corpus. Each triple of the first list comprises a first term representing a candidate hyponym, a second term representing a candidate hypernym, and a frequency value indicative of a number of times a hypernymy relation is observed between the candidate hyponym and the candidate hypernym in the text corpus. The program instructions are further executable by the processor to cause the processor to train a neural network for hypernym induction based on the first list. The trained neural network is a SPON model.

A hyponym is a term representing an abstraction, such as a type or class. A hypernym is a term representing an abstraction, such as a type or class, that is more generic than a hyponym.

A named entity (NE) is a proper noun. Available NE types are limited and pre-defined, ranging from dozens to hundreds at most. By comparison, hypernyms are broader than NE types. For example, there are over a hundred thousand unique hypernyms in WordNet, a manually constructed database of hypernymy relations.

Hypernyms are building blocks for taxonomy construction. A hypernymy relation (i.e., relationship) comprises of an is-a (i.e., is a) relation between a hyponym and a hypernym. For example, potato pancake is-a pancake is a hypernymy relation between the hyponym potato pancake and the hypernym pancake.

Hypernymy relations within a taxonomy satisfy the following properties: reflexivity, transitivity, and asymmetry (i.e., not symmetric). For example, if Wittgenstein is-a philosopher and philosopher is-a person, it follows that Wittgenstein is-a person by the transitive property. It also follows that philosopher is not Wittgenstein and person is not philosopher by the asymmetry property.

For expository purposes, the term "hyponym-hypernym pair" generally refers to a pair of terms comprising a hyponym and a hypernym that exhibits a hypernymy relation.

For expository purposes, the term "hypernym detection" generally refers to a task of classifying or predicting whether a given pair of terms (x, y) (e.g, (robin, passerine)) are in a hypernymy relation.

For expository purposes, the term "hypernym direction" generally refers to a task of identifying or predicting which term in a given pair of terms (x, y) is the hypernym (i.e., which of (x, y) or (y, x) is in a hypernymy relation).

For expository purposes, the term "hypernym discovery" generally refers to a task of predicting, for a given hyponym x, ranked predictions of hypernyms for the given hyponym x.

The ability to generalize the meaning of domain-specific terms is essential for many natural language processing (NLP) applications. However, building taxonomies by hand for a new domain is time-consuming. This drives the requirement to develop automatic systems that are able to identify hypernymy relationships from text.

Conventionally, supervised machine learning systems can be trained to predict hypernyms if there is sufficient training data. However, training data may not be available equally across all domains.

Embodiments of the invention provide a method and system for automatic extraction of hyponym-hypernym pairs from unstructured free text using a deep neural network model that learns how to encode hypernymy relationships. Embodiments of the invention can be used to perform tasks such as, but not limited to, hypernym detection, hypernym direction, and hypernym discovery. Each task can be performed in either in an unsupervised or supervised manner.

In order theory, a strict partial order is a binary relation that is transitive, irreflexive, and asymmetric. Strict partial order relations correspond more directly to directed acyclic graphs (DAGs). For example, DAGs are used for hypernymy relation hierarchy in WordNet.

Embodiments of the invention provide a SPON designed to learn and model hyponym-hypernym pairs representing hypernymy relationships within a taxonomy. A SPON is a neural network architecture comprising non-negative activations and residual connections designed to enforce the asymmetry and transitivity requirements of strict partial order relations as soft constraints. One embodiment provides a SPON model trained to enforce the asymmetry and transitivity requirements of strict partial order relations as soft constraints. During a learning process, the SPON model is trained with hyponym-hypernym pairs. In one embodiment, an augmented variant of the SPON model can generalize type information learned for in-vocabulary terms to previously unseen ones to identify/predict hypernyms for out-of-vocabulary (OOV) terms (i.e., terms that are not observed/seen by the SPON model during the learning process); the augmented variant does this using normalized distributional similarity values as weights within a probabilistic model.

FIG. 1 illustrates an example computing architecture 100 for implementing neural network-based hypernym induction, in accordance with an embodiment of the invention. In one embodiment, the computing architecture 100 is a centralized computing architecture. In another embodiment, the computing architecture 100 is a distributed computing architecture.

In one embodiment, the computing architecture 100 comprises computation resources such as, but not limited to, one or more processor units 110 and one or more storage units 120. One or more applications execute/operate on the computing architecture 100 utilizing the computation resources of the computing architecture 100. In one embodiment, the applications on the computing architecture 100 include, but are not limited to, a neural network-based hypernym induction system 200 configured for automatic extraction of hyponym-hypernym pairs from a text corpus (e.g., unstructured free text) utilizing a deep neural network that learns to encode hypernymy relationships. For example, in one embodiment, the neural network-based hypernym induction system 200 is used to automatically extract hyponym-hypernym pairs from an unannotated large text corpus.

As described in detail later herein, in one embodiment, the neural network utilized by the neural network-based hypernym induction system 200 is a SPON model 250 (FIG. 2) trained to enforce the asymmetry and transitivity requirements of strict partial order relations as soft constraints in the context of hypernym induction.

In one embodiment, the neural network-based hypernym induction system 200 is configured to exchange data with one or more electronic devices 400 and/or one or more remote server devices 20 over a connection (e.g., a wireless connection such as a Wi-Fi connection or a cellular data connection, a wired connection, or a combination of the two).

In one embodiment, an electronic device 400 comprises one or more computation resources such as, but not limited to, one or more processor units 410 and one or more storage units 420. One or more applications execute/operate on an electronic device 400 utilizing the one or more computation resources of the electronic device 400 such as, but not limited to, one or more software applications 450 loaded onto or downloaded to the electronic device 400. Examples of software applications 450 include, but are not limited to, artificial intelligence (AI) applications, NLP applications.

Examples of an electronic device 400 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 400 comprises one or more input/output (I/O) units 430 integrated in or coupled to the electronic device 400, such as a keyboard, a keypad, a touch interface, a display screen, etc. A user utilizes an I/O module 430 of an electronic device 400 to configure one or more user preferences, configure one or more parameters (e.g., hyper-parameters for the SPON model 250, etc.), provide input (e.g., manually labeled training data, such as a list of manually validated is-a relationships), etc.

In one embodiment, an electronic device 400 and/or a remote server device 20 is a source of training data and/or a text corpus.

In one embodiment, the neural network-based hypernym induction system 200 is accessed or utilized by one or more online services (e.g., AI services, NLP services) hosted on a remote server device 20 and/or one or more software applications 450 (e.g., AI applications, NLP applications) operating on an electronic device 400. For example, in one embodiment, a virtual assistant, a search engine, or another type of software application 450 operating on an electronic device 400 invokes the system 200 to perform hypernym detection, hypernym direction, and/or hypernym discovery to generate broader or narrower search terms, answer questions by finding more general categories, build taxonomies and knowledge bases, etc.

Figure 2:
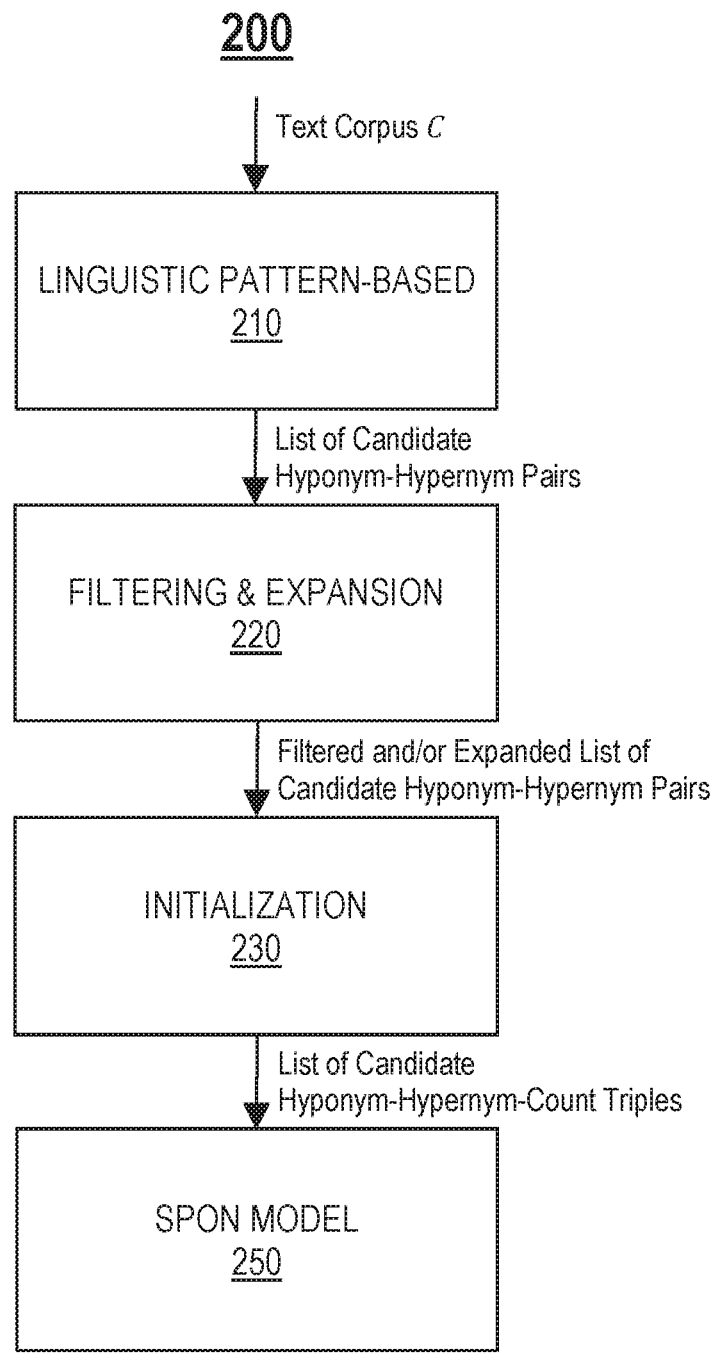
FIG. 2 illustrates an example neural network-based hypernym induction system, in accordance with an embodiment of the invention.

FIG. 2 illustrates an example neural network-based hypernym induction system 200, in accordance with an embodiment of the invention. In one embodiment, the system 200 comprises a linguistic pattern-based unit 210 configured to: (1) receive, as an input, a text corpus (e.g., unstructured free text), and (2) generate, based on the text corpus, a list of candidate hyponym-hypernym pairs. Let C generally denote a text corpus received as an input.

In one embodiment, the linguistic pattern-based unit 210 is configured to generate a list of candidate hyponym-hypernym pairs by applying one or more linguistic patterns to a text corpus C to extract one or more candidate hyponym-hypernym pairs, wherein the list comprises of one or more extracted candidate hyponym-hypernym pairs. For example, in one embodiment, the one or more linguistic patterns applied comprises Hearst-like patterns. In another embodiment, the linguistic pattern-based unit 210 is configured to generate a list of candidate hyponym-hypernym pairs based on a manually labeled training set (e.g., a list of manually validated is-a relationships) provided to the system 200.

In one embodiment, the linguistic pattern-based unit 210 is configured to remove a candidate hyponym-hypernym pair that is likely erroneous (i.e., incorrect or spurious), if any, from a list of candidate hyponym-hypernym pairs based on one or more statistical significance and circumstantial evidences. For example, in one embodiment, if a candidate hypernym (of a candidate hyponym-hypernym pair) included in a list of candidate hyponym-hypernym pairs is a sub-term (but not a lexical head) of several other candidate hypernyms included in the list, the linguistic pattern-based unit 210 flags/identifies the candidate hypernym and the several other candidate hypernyms as likely erroneous for removal. As another example, if "X is-a Y" and "Y is-a Z" are validated hypernymy relations, it follows that "Z is-not-a X" by the asymmetry property; the linguistic pattern-based unit 210 flags/identifies a candidate hyponym-hypernym pair representing "Z is-a X" as likely erroneous for removal.

In one embodiment, the system 200 comprises a filtering and expansion unit 220 configured to: (1) receive a list of candidate hyponym-hypernym pairs (e.g., from the linguistic pattern-based unit 210), and (2) improve quality of the received list by applying one or more filtering and/or expansion techniques to the received list to filter and/or expand the received list.

In one embodiment, the filtering and expansion unit 220 automatically filters a list of candidate hyponym-hypernym pairs to remove one or more candidate hyponym-hypernym pairs that are likely erroneous, if any, based on heuristics. For example, in one embodiment, the filtering and expansion unit 220 filters the list based on a heuristic defined as follows: if a candidate hypernym of a candidate hyponym-hypernym pair included in the list is a proper noun, filter out (i.e., remove) the pair from the list as the pair is erroneous (e.g., a candidate hyponym-hypernym pair (x, North America) is filtered out). As another example, in one embodiment, the filtering and expansion unit 220 filters the list based on a heuristic defined as follows: if there exists a sequence of terms $x_1$, $x_2$, and $x_3$ such that $(x_1, x_2)$, $(x_2, x_3)$ and $(x_3, x_1)$ are candidate hyponym-hypernym pairs of the list, filter out one of these pairs from the list to break a cycle formed between the terms.

In one embodiment, the filtering and expansion unit 220 automatically expands a list of candidate hyponym-hypernym pairs to include one or more additional candidate hyponym-hypernym pairs by exploiting super-terms and sub-terms. The one or more additional candidate hyponym-hypernym pairs are not extracted from a text corpus C and not included in a manually labeled training set. For example, (Bank of America, Bank) is a candidate hyponym-hypernym pair resulting from exploiting the terms Bank of America and Bank, wherein Bank of America is a super-term of Bank, and Bank is a sub-term of Bank of America.

In one embodiment, the system 200 comprises an initialization unit 230 configured to control how a SPON model 250 is initialized. The initialization unit 230 is configured to: (1) receive a list of candidate hyponym-hypernym pairs (e.g., from the filtering and expansion unit 220 or the linguistic-pattern based unit 210), and (2) generate a list of candidate hyponym-hypernym-count triples, wherein each triple comprises a candidate hyponym, a candidate hypernym, and a frequency (i.e., count) indicative of a number of times a hypernymy relation is observed between the candidate hyponym and the candidate hypernym in a text corpus C. For example, (Ireland, country, 795), (shop, public area, 78), and (Bhutto, political party, 6) are some examples of triples extracted from Wikipedia corpora.

In one embodiment, the initialization unit 230 is configured to encode each term (i.e., candidate hyponym, candidate hypernym) of a list of candidate hyponym-hypernym-count triples based on a either a pre-initialized word/character embedding or a word/character embedding trained from a text corpus C, such that the resulting list includes initial (i.e., initialization) vectors for each term of the list. For example, if each term of the list is encoded based on a pre-initialized word/character embedding, the SPON model 250 is initialized using external pre-trained vectors. As another example, if each term of the list is encoded based on a word/character embedding trained from a text corpus C, the SPON model 250 is initialized using embeddings from the text corpus C.

In one embodiment, during a learning process (i.e., a learning or training phase/stage), the system 200 is configured to train a SPON model 250 based on training data comprising is-a relations. Let $\mathcal{T}$ generally denote training data used to train the SPON model 250. In one embodiment, the training data $\mathcal{T}$ comprises candidate hyponym-hypernym pairs. For example, in one embodiment, the system 200 feeds a list of candidate hyponym-hypernym-count triples (e.g., from the initialization unit 230) to the SPON model 250 as the training data $\mathcal{T}$. As described in detail later herein, during the learning process, the SPON model 250 is trained against a loss function that satisfies the asymmetry and transitivity requirements of strict partial order relations as soft constraints.

A trained SPON model 250 resulting from the learning process is configured to induce hypernymy relations. In one embodiment, in a deployment phase/stage, the trained SPON model 250 is used to perform tasks such as, but not limited to, hypernym detection, hypernym direction, and hypernym discovery. For example, in one embodiment, the trained SPON model 250 is applied to classify/predict whether an unseen pair of terms (i.e., a pair of terms not seen in the training data) are in a hypernymy relation.

Figure 3:
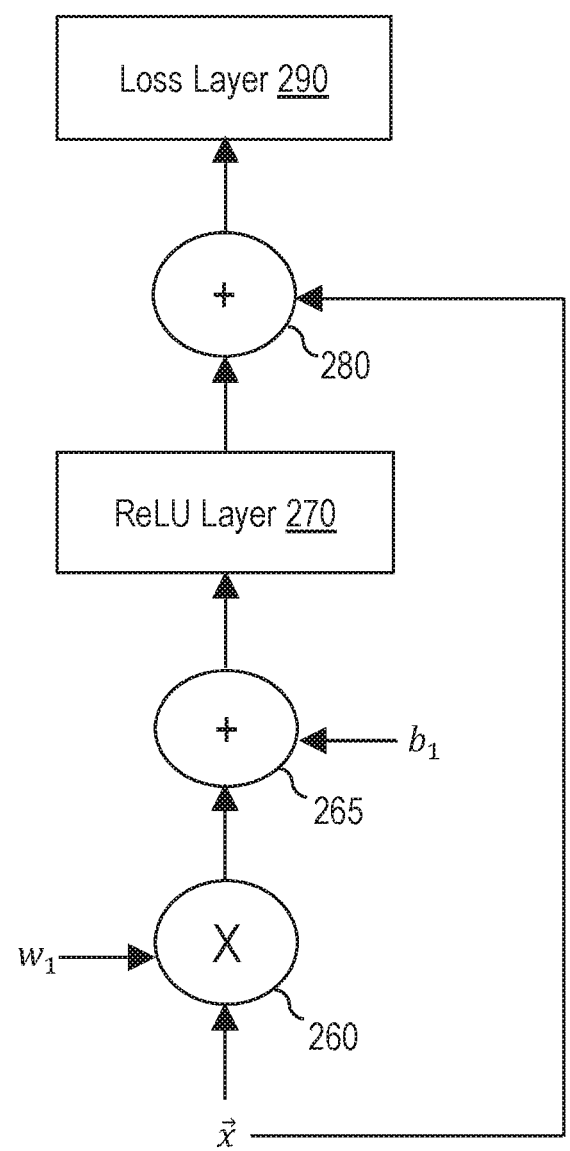
FIG. 3 illustrates an example strict partial order network (SPON) model, in accordance with an embodiment of the invention.

FIG. 3 illustrates an example SPON model 250, in accordance with an embodiment of the invention. In one embodiment, the SPON model 250 is a neural network architecture trained to enforce the asymmetry and transitivity requirements of strict partial order relations as soft constraints.

Let E generally denote a vocabulary of terms (i.e., a set of all terms of candidate hyponym-hypernym pairs observed/seen in the training data $\mathcal{T}$), and let ϕ generally denote a triple included in a list of candidate hyponym-hypernym-count triples, wherein ϕ=(x, y, s), x∈ε, y∈ε, and s is a frequency (i.e., count) for a candidate hyponym-hypernym pair (x, y) that is indicative of a number of times a hypernymy relation is observed between x and y.

In one embodiment, during the learning process, the SPON model 250 is trained using positive examples (i.e., positive instances) and negative examples (i.e., negative instances) derived from the training data $\mathcal{T}$. Let $\mathcal{H}$ generally denote a set of all hypernyms observed/seen in the training data $\mathcal{T}$. Each positive instance comprises a pair of terms (x, $\mathcal{H}_x$), wherein $\mathcal{H}_x$ is a set of candidate hypernyms for a given candidate hyponym x in the training data $\mathcal{T}$. Each negative instance comprises a pair of terms (x, $\mathcal{H}'_x$), wherein $\mathcal{H}'_x$ is a set of negative hypernym samples (i.e., false hypernyms) for a given candidate hyponym x in the training data $\mathcal{T}$. In one embodiment, the system 200 is configured to generate negative instances for a given candidate hyponym x using random negative sampling (i.e., selecting terms uniformly at random from $\mathcal{H} \setminus \mathcal{H}_x$, wherein the selected terms behave as hypernyms but are not hypernyms for a given candidate hyponym x).

Let $\vec{x}$ generally denote an input vector, wherein $\vec{x} \in \mathbb{R}^d$, and each term x∈ε is represented via the input vector $\vec{x}$. The SPON model 250 comprises a multiplication unit 260 configured to perform an element-wise multiplication of the input vector x with a weight vector $w_1$ to obtain a weighted vector $w_1 \otimes \vec{x}$, wherein ⊗ is element-wise multiplication. The SPON model 250 comprises an addition unit 265 configured to add the weighted vector $w_1 \otimes \vec{x}$ to a bias vector $b_1$ to obtain a biased and weighted vector $w_1 \otimes \vec{x} + b_1$.

Let $f$ and g denote functions, wherein $f: \mathbb{R}^d \to \mathbb{R}^d$, and g: $\mathbb{R}^d \to \mathbb{R}^d$. In one embodiment, the functions $f$ and g satisfy two constraints: First, the functions $f$ and g satisfy the constraint that the function g is a non-linear non-negative activation function. In one embodiment, the SPON model 250 comprises a rectified linear unit (ReLU) layer 270 configured to satisfy this constraint by implementing the function g as a smooth function represented by equation (1) provided below:

$$g(\vec{x}) = \text{ReLU}(w_1 \otimes \vec{x} + b_1) = \max(0, w_1 \otimes \vec{x} + b_1) \qquad (1).$$

Second, the functions $f$ and g satisfy the constraint represented by equation (2) provided below:

$$f(\vec{x}) = \vec{x} + g(\vec{x}) \qquad (2).$$

In one embodiment, the SPON model 250 comprises an addition unit 280 configured to add $g(\vec{x})$ from the ReLU layer 270 to the input vector $\vec{x}$ to obtain $f(\vec{x})$ in accordance with equation (2).

The two constraints for the functions $f$ and g ensure that $f(x) \geq x$ component-wise Let $\underline{y}$ generally denote an input vector, wherein $\vec{y} \in \mathbb{R}^d$, and each term y∈ε is represented via input vector $\vec{y}$. During the learning process, SPON model 250 is trained to model the hypernymy relation "x is-a y" by learning suitable model parameters θ that ensures $f(\vec{x}) < \vec{y}$ component-wise. The condition of $f(\vec{x}) < \vec{y}$ component-wise is imposed as a soft constraint, and the system 200 ensures that the violations to this constraint (encoded via a loss function) are minimized as much as possible.

Let $\vec{z}$ generally denote an input vector, wherein $\vec{z} \in \mathbb{R}^d$, and each term z∈ε is represented via the input vector $\vec{z}$. If the model parameters θ are learned in such a way that "x is-a y" implies $f(\vec{x}) < \vec{y}$ component-wise (and vice versa), (i.e., violations to this inequality is zero), then the SPON model 250 satisfies the asymmetry and transitivity requirements of strict partial order relations.

For example, if "x is-a y" and "y is-a z", it follows that $f(\vec{x}) < \vec{y}$ component-wise and $f(\vec{y}) < \vec{z}$ component-wise. From equation (1), it is clear that $g(\vec{u}) \geq 0$ for all $\vec{u} \in \mathbb{R}^d$. Applying the expression $g(\vec{u}) \geq 0$ to equation (2) results in the expression $f(\vec{u}) \geq \vec{u}$ component-wise for all $\vec{u} \in \mathbb{R}^d$. Thus, it is true that $f(\vec{y}) \geq \vec{y}$. Hence, $f(\vec{x}) < \vec{u} \leq f(\vec{y}) < \vec{z}$ component-wise, or in other words "x is-a z". This proves the transitive property of the SPON model 250.

As another example, if "x is-a y" it follows that $f(\vec{x}) < \vec{y}$ component-wise. Using the observation in the previous point, $f(\vec{y}) \geq \vec{y}$ component-wise for all $\vec{y} \in \mathbb{R}^d$. From both these points $f(\vec{y}) \geq \vec{y} > f(\vec{x}) \geq \vec{x}$ component-wise, or in other words "y is-not-a x". This proves the asymmetry property of the model SPON model 250.

Let ψ(x, y) denote a loss value capturing distance to satisfaction for a candidate hyponym-hypernym pair (x, y) (i.e., distance/how far to satisfying the inequality $f(\vec{x}) < \vec{y}$ component-wise). In one embodiment, to ensure that the condition $f(\vec{x}) < \vec{y}$ component-wise is violated as little as possible during the learning process, the SPON model 250 comprises of a loss layer 290 configured to compute a loss value ψ(x, y) in accordance with equation (3) provided below:

$$\psi(x,y) = \Sigma_{i=1}^d \max(0, \epsilon f(\vec{x})_i - \vec{y}_i) \qquad (3),$$

wherein the sum is taken over all components of participating dimensions d, and ϵ is a scalar hyper-parameter. In one embodiment, the SPON model 250 is configured to compute and minimize a cross entropy loss for each candidate hyponym-hypernym pair (x, y), wherein the cross entropy loss is weighted, and weights factored in the cross-entropy loss are computed as a function of a frequency parameter.

For tasks where hypernymy relations need to be automatically induced from a text corpus C, applying linguistic patterns, such as Hearst-like patterns, to the text corpus C may not be exhaustive. Some applications have a practical requirement of assigning out-of-vocabulary OOV hyponyms to their most likely correct type(s). In one embodiment, the system 200 fulfills this requirement via hypernym discovery, thereby allowing creation of hypernymy relations from a text corpus C and avoiding the problem of sparsity that often characterizes most knowledge bases. In one embodiment, the system 200 implements hypernym discovery by leveraging distributional similarity metrics between words in the same text corpus C.

For example, in one embodiment providing an augmented variant of the SPON model 250, the SPON model 250 is trained, during the learning process, to learn embedding for words/characters (i.e., terms) appearing in the training data $\mathcal{T}$. Let $\mathcal{O}^{test}$ generally denote OOV input test hyponyms. In one embodiment, the SPON model 250 is configured to generate top-k ranked hypernyms for each hyponym within $\mathcal{O}^{test}$ wherein k is a positive integer. Let $Y_x$ generally denote a random variable denoting an assignment of a hypernym for an OOV hyponym x that is not seen in the training data $\mathcal{T}$, wherein $Y_x$ takes a value within a set of known hypernyms in the training data $\mathcal{T}$ (denoted by $\mathcal{H}$). The SPON model 250 is configured to compute a probability of a random variable $Y_x$ taking on a value $c \in \mathcal{H}$ in accordance with equation (4) provided below:

$$P(Y_x = c \mid x) = \sum_{h \in \varepsilon} P(Y_x = c, h \mid x) = \qquad (4)$$
$$\sum_{h \in \varepsilon} P(Y_x = c \mid h, x) \cdot P(h \mid x) \approx \sum_{h \in S_x^p} P(Y_x = c \mid h) \cdot m(h \mid x),$$

wherein $Y_x \perp x \mid h$ (i.e., $Y_x$ is independent of x given h), m is a scoring function that provides a score between [0, 1] (i.e., m is a (normalized) similarity function, wherein $m: \mathbb{R}^d \times \mathbb{R}^d \to [0, 1]$), $S_x^p$ contains p-terms from $\varepsilon$ that provide top-p largest values for the scoring function m, and p is a hyperparameter. In one embodiment, the SPON model 250 first normalizes the values of m(h|x) where $h \in S_x^p$ using a softmax operation, before computing the weighted sum in accordance with equation (4).

Table 1 below provides examples of ranked predictions (from left-to-right) of hypernyms resulting from the SPON model 250 performing hypernym discovery on a set of eight randomly selected test queries from a Semeval-2018 English dataset.

TABLE 1

| Term | Predicted hypernyms |
| --- | --- |
| dicoumarol | drug, carbohydrate, acid, person, service, . . . |
| Planck | person, particle, physics, elementary particle, service, . . . |
| Belt Line | main road, infrastructure, transport infrastructure, expressway, way, . . . |
| relief | service, assistance, resource, support, aid, . . . |
| honesty | virtue, ideal, moral philosophy, philosophy, chastity, . . . |
| shoe | footwear, shoe, footgear, overshoe, sandal, . . . |
| ethanol | alcohol, fuel, person, fluid, resource, . . . |
| ruby | language, precious stone, person, resource, stone, . . . |

As shown in Table 1, the top four query terms are OOV hyponym terms, while the bottom four query terms are in-vocabulary hyponym terms. Predicted hypernyms that match expected hypernyms are in bold, and predicted hypernyms that are not included in expected hypernyms are underlined.

Figure 4:
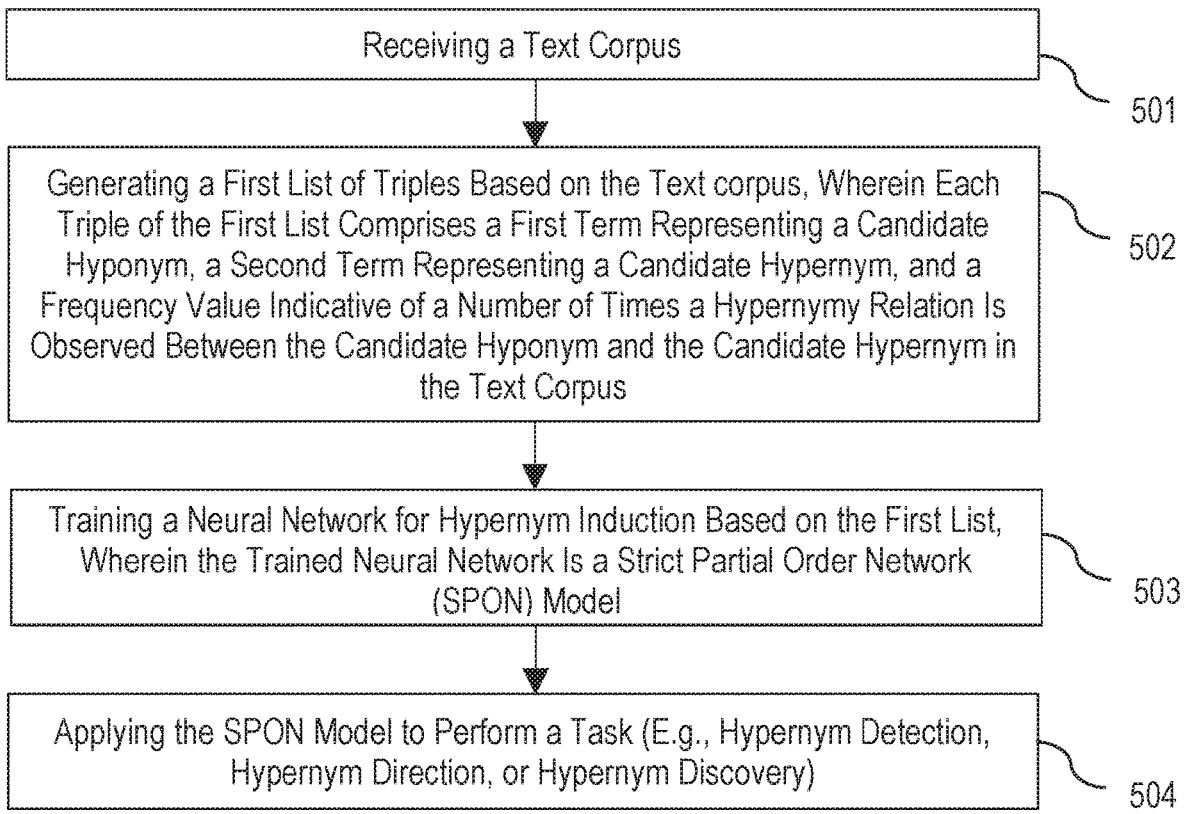
FIG. 4 is a flowchart for an example process for neural network-based hypernym induction, in accordance with an embodiment of the invention.

FIG. 4 is a flowchart for an example process 500 for neural network-based hypernym induction, in accordance with an embodiment of the invention. Process block 501 includes receiving a text corpus. Process block 502 includes generating a first list of triples based on the text corpus, wherein each triple of the first list comprises a first term representing a candidate hyponym, a second term representing a candidate hypernym, and a frequency value indicative of a number of times a hypernymy relation is observed between the candidate hyponym and the candidate hypernym in the text corpus. Process block 503 includes training a neural network for hypernym induction based on the first list, where the trained neural network is a strict partial order network (SPON) model. Process block 504 includes applying the SPON model to perform a task (e.g., hypernym detection, hypernym direction, or hypernym discovery).

In one embodiment, process blocks 501-504 are performed by one or more components of the system 200.

Figure 5:
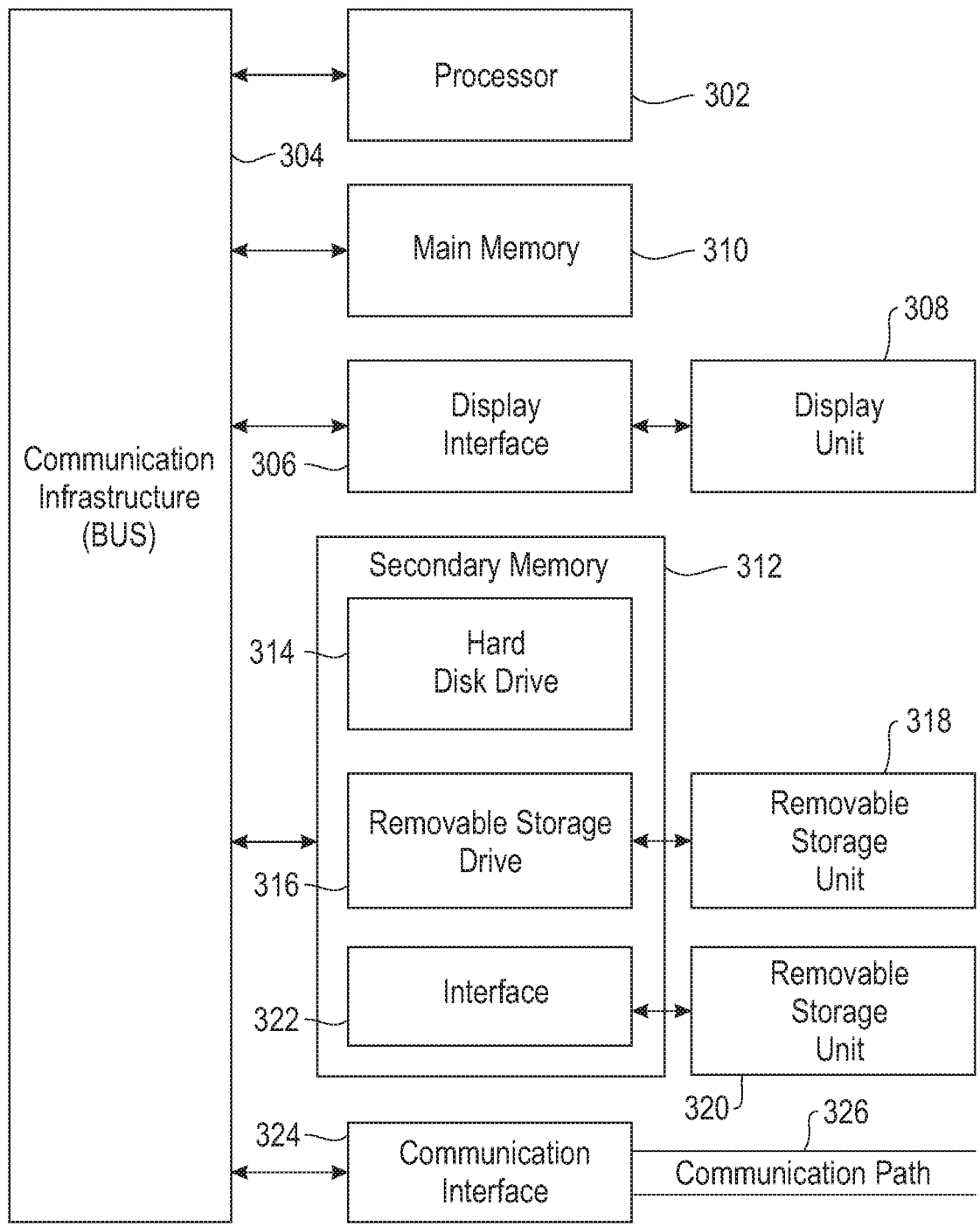
FIG. 5 is a high level block diagram showing an information processing system useful for implementing an embodiment of the present invention.

FIG. 5 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. In one embodiment, the computer system also includes a main memory 310, preferably random access memory (RAM), and also includes a secondary memory 312. In one embodiment, the secondary memory 312 includes, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 includes other similar means for allowing computer programs or other instructions to be loaded into the computer system. Such means include, for example, a removable storage unit 320 and an interface 322. Examples of such means include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

In one embodiment, the computer system also includes a communication interface 324. Communication interface 324 allows software and data to be transferred between the computer system and external devices. In one embodiment, examples of communication interface 324 include a modem, a network interface (such as an Ethernet card), a communication port, or a PCMCIA slot and card, etc. In one embodiment, software and data transferred via communication interface 324 are in the form of signals which are, for example, electronic, electromagnetic, optical, or other signals capable of being received by communication interface

324. These signals are provided to communication interface 324 via a communication path (i.e., channel) 326. In one embodiment, this communication path 326 carries signals and is implemented using wire or cable, fiber optics, a phone line, a cellular phone link, an RF link, and/or other communication channels.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the present invention provide a system, computer program product, and method for implementing the embodiments of the invention. Embodiments of the present invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the present invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
receiving a text corpus;
generating a first list of triples based on the text corpus, wherein each triple of the first list comprises a first term representing a candidate hyponym, a second term representing a candidate hypernym, and a frequency value indicative of a number of times a hypernymy relation is observed between the candidate hyponym and the candidate hypernym in the text corpus;
training, via machine learning, a neural network for hypernym induction based on the first list, wherein the trained neural network is a strict partial order network (SPON) comprising a layer of activations and connections that enforce asymmetry and transitivity requirements of strict partial order relations as soft constraints; and
applying the trained neural network to perform at least one of hypernym detection, hypernym direction, and hypernym discovery.

2. The method of claim 1, wherein generating a first list of triples based on the text corpus comprises:
extracting one or more candidate hyponym-hypernym pairs from the text corpus by applying linguistic patterns to the text corpus, wherein each candidate hyponym-hypernym pair comprises a pair of terms representing a candidate hyponym and a candidate hypernym;
generating a second list comprising each candidate hyponym-hypernym pair extracted from the text corpus;
applying at least one of a filtering technique and an expansion technique to the second list;
generating the first list based on the second list, wherein the first list includes each candidate hyponym-hypernym pair of the second list and a corresponding frequency value indicative of a number of times a hypernymy relation is observed between a candidate hyponym and a candidate hypernym of the candidate hyponym-hypernym pair; and
encoding each term of the first list.

3. The method of claim 2, wherein applying at least one of a filtering technique and an expansion technique to the second list comprises one or more of: filtering the second list to remove at least one candidate hyponym-hypernym pair that is erroneous, and expanding the second list to include at least one candidate hyponym-hypernym pair that is not extracted from the text corpus.

4. The method of claim 2, wherein the linguistic patterns are Hearst-like patterns.

5. The method of claim 1, wherein the training comprises:
training the neural network against a loss function that enforces the asymmetry and transitivity requirements of the strict partial order relations as the soft constraints.

6. The method of claim 5, wherein the training further comprises:
training the neural network to learn embedding for terms appearing in the first list.

7. The method of claim 6, further comprising:
generating, via the SPON, ranked predictions of hypernyms for an out-of-vocabulary hyponym by leveraging distributional similarity metrics between the terms.

8. A system comprising:
at least one processor; and
a non-transitory processor-readable memory device storing instructions that when executed by the at least one processor causes the at least one processor to perform operations including:
receiving a text corpus;
generating a first list of triples based on the text corpus, wherein each triple of the first list comprises a first term representing a candidate hyponym, a second term representing a candidate hypernym, and a frequency value indicative of a number of times a hypernymy relation is observed between the candidate hyponym and the candidate hypernym in the text corpus;
training, via machine learning, a neural network for hypernym induction based on the first list, wherein the trained neural network is a strict partial order network (SPON) comprising a layer of activations and connections that enforce asymmetry and transitivity requirements of strict partial order relations as soft constraints; and applying the trained neural network to perform at least one of hypernym detection, hypernym direction, and hypernym discovery.

9. The system of claim 8, wherein generating a first list of triples based on the text corpus comprises:

extracting one or more candidate hyponym-hypernym pairs from the text corpus by applying linguistic patterns to the text corpus, wherein each candidate hyponym-hypernym pair comprises a pair of terms representing a candidate hyponym and a candidate hypernym;

generating a second list comprising each candidate hyponym-hypernym pair extracted from the text corpus;

applying at least one of a filtering technique and an expansion technique to the second list;

generating the first list based on the second list, wherein the first list includes each candidate hyponym-hypernym pair of the second list and a corresponding frequency value indicative of a number of times a hypernymy relation is observed between a candidate hyponym and a candidate hypernym of the candidate hyponym-hypernym pair; and encoding each term of the first list.

10. The system of claim 9, wherein applying at least one of a filtering technique and an expansion technique to the second list comprises one or more of: filtering the second list to remove at least one candidate hyponym-hypernym pair that is erroneous, and expanding the second list to include at least one candidate hyponym-hypernym pair that is not extracted from the text corpus.

11. The system of claim 9, wherein the linguistic patterns are Hearst-like patterns.

12. The system of claim 8, wherein the training comprises:

training the neural network against a loss function that enforces the asymmetry and transitivity requirements of the strict partial order relations as the soft constraints.

13. The system of claim 12, wherein the training further comprises:

training the neural network to learn embedding for terms appearing in the first list.

14. The system of claim 13, wherein the operations further include:

generating, via the SPON, ranked predictions of hypernyms for an out-of-vocabulary hyponym by leveraging distributional similarity metrics between the terms.

15. A computer program product comprising a computer readable storage medium having program instructions embodied therewith, the program instructions executable by a processor to cause the processor to:

receive a text corpus;

generate a first list of triples based on the text corpus, wherein each triple of the first list comprises a first term representing a candidate hyponym, a second term representing a candidate hypernym, and a frequency value indicative of a number of times a hypernymy relation is observed between the candidate hyponym and the candidate hypernym in the text corpus;

train, via machine learning, a neural network for hypernym induction based on the first list, wherein the trained neural network is a strict partial order network (SPON) comprising a layer of activations and connections that enforce asymmetry and transitivity requirements of strict partial order relations as soft constraints; and apply the trained neural network to perform at least one of hypernym detection, hypernym direction, and hypernym discovery.

16. The computer program product of claim 15, wherein generating a first list of triples based on the text corpus comprises:

extracting one or more candidate hyponym-hypernym pairs from the text corpus by applying linguistic patterns to the text corpus, wherein each candidate hyponym-hypernym pair comprises a pair of terms representing a candidate hyponym and a candidate hypernym;

generating a second list comprising each candidate hyponym-hypernym pair extracted from the text corpus;

applying at least one of a filtering technique and an expansion technique to the second list;

generating the first list based on the second list, wherein the first list includes each candidate hyponym-hypernym pair of the second list and a corresponding frequency value indicative of a number of times a hypernymy relation is observed between a candidate hyponym and a candidate hypernym of the candidate hyponym-hypernym pair; and encoding each term of the first list.

17. The computer program product of claim 16, wherein applying at least one of a filtering technique and an expansion technique to the second list comprises one or more of: filtering the second list to remove at least one candidate hyponym-hypernym pair that is erroneous, and expanding the second list to include at least one candidate hyponym-hypernym pair that is not extracted from the text corpus.

18. The computer program product of claim 16, wherein the linguistic patterns are Hearst-like patterns.

19. The computer program product of claim 15, wherein the training comprises:

training the neural network against a loss function that enforces the asymmetry and transitivity requirements of the strict partial order relations as the soft constraints.

20. The computer program product of claim 19, wherein the training further comprises:

training the neural network to learn embedding for terms appearing in the first list.

\* \* \* \* \*